United States Patent
Rosenthal

(10) Patent No.: US 11,900,336 B2
(45) Date of Patent: Feb. 13, 2024

(54) COMPUTER-BASED SYSTEMS CONFIGURED FOR AUTOMATED ACTIVITY VERIFICATION BASED ON OPTICAL CHARACTER RECOGNITION MODELS AND METHODS OF USE THEREOF

(71) Applicant: Capital One Services, LLC, McLean, VA (US)

(72) Inventor: Bryan Rosenthal, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 164 days.

(21) Appl. No.: 16/867,110

(22) Filed: May 5, 2020

(65) Prior Publication Data
US 2021/0350376 A1 Nov. 11, 2021

(51) Int. Cl.
*G06Q 20/04* (2012.01)
*G06Q 20/40* (2012.01)
(Continued)

(52) U.S. Cl.
CPC ....... *G06Q 20/042* (2013.01); *G06Q 20/4016* (2013.01); *G06V 30/19173* (2022.01);
(Continued)

(58) Field of Classification Search
CPC .......... G06Q 20/4016; G06Q 20/042; G06Q 30/0261; G06Q 40/00; G06Q 20/3226; G06V 30/413; G06V 30/414; G06V 30/416; G06V 30/418

USPC .. 705/1.1, 14.23, 30, 38, 39, 40, 41, 45, 75, 705/2, 21, 24, 44, 72; 348/150; 235/383; 455/406

See application file for complete search history.

(56) References Cited

U.S. PATENT DOCUMENTS 8,762,270 B1 * 6/2014 Evans .................... G06Q 40/00
455/406
9,805,370 B1 * 10/2017 Quigley .............. H04W 12/033
(Continued)

OTHER PUBLICATIONS

U.S. Appl. No. 60/835,151, dated Aug. 1, 2006, 2 pages.*

*Primary Examiner* — Hani M Kazimi
*Assistant Examiner* — Sanjeev Malhotra
(74) *Attorney, Agent, or Firm* — Greenberg Traurig, LLP

(57) ABSTRACT

Systems and methods for detecting and mitigating fraud include a processor for performing steps including receiving a digital image of a receipt and utilizing an optical character recognition model to encode a digital representation of transaction information from the receipt. The processor extracts a payee feature, an amount feature, and a payment date feature from the transaction data, and generating a receipt feature vector from the payee feature, the amount feature and the payment date feature. The processor receives historical transaction data representing historical transactions, generates a transaction feature vector for each historical transaction and then utilizes a machine learning model to predict a matching transaction from the transaction history that matches the receipt based on the receipt feature vector and each of the transaction feature vectors to determine a difference between the payment amount of the receipt and the payment authorization of the matching transaction.

12 Claims, 8 Drawing Sheets

(51) Int. Cl.
*G06V 30/413* (2022.01)
*G06V 30/414* (2022.01)
*G06V 30/416* (2022.01)
*G06V 30/418* (2022.01)
*G06V 30/40* (2022.01)
*G06V 30/19* (2022.01)
*G06V 30/10* (2022.01)

(52) U.S. Cl.
CPC ............ *G06V 30/40* (2022.01); *G06V 30/413* (2022.01); *G06V 30/414* (2022.01); *G06V 30/416* (2022.01); *G06V 30/418* (2022.01); *G06V 30/10* (2022.01)

(56) References Cited

U.S. PATENT DOCUMENTS

| | | | | |
|---|---|---|---|---|
| 10,366,378 | B1* | 7/2019 | Han | G06Q 20/204 |
| 11,151,468 | B1* | 10/2021 | Chen | G06N 7/01 |
| 11,182,794 | B1* | 11/2021 | Aument | G07F 7/0886 |
| 2003/0187796 | A1* | 10/2003 | Swift | G06Q 20/042 |
| | | | | 705/45 |
| 2005/0071283 | A1* | 3/2005 | Randle | G06Q 20/12 |
| | | | | 705/75 |
| 2008/0116268 | A1* | 5/2008 | Swift | G06Q 20/403 |
| | | | | 235/383 |
| 2009/0076957 | A1* | 3/2009 | Bishop | G06Q 40/00 |
| | | | | 705/40 |
| 2009/0150269 | A1* | 6/2009 | Bishop | G06Q 40/00 |
| | | | | 705/30 |
| 2010/0057622 | A1* | 3/2010 | Faith | G06Q 20/3829 |
| | | | | 705/38 |
| 2010/0161466 | A1* | 6/2010 | Gilder | G06Q 40/12 |
| | | | | 705/40 |
| 2011/0087546 | A1* | 4/2011 | Fordyce, III | G06Q 30/02 |
| | | | | 705/39 |
| 2012/0066065 | A1* | 3/2012 | Switzer | G06Q 30/0255 |
| | | | | 705/1.1 |
| 2012/0330831 | A2* | 12/2012 | Ross | G06Q 20/10 |
| | | | | 705/44 |
| 2013/0024371 | A1* | 1/2013 | Hariramani | G06Q 20/384 |
| | | | | 705/41 |
| 2013/0339218 | A1* | 12/2013 | Subramanian | G06Q 30/06 |
| | | | | 705/38 |
| 2014/0046841 | A1* | 2/2014 | Gauvin | G06Q 40/02 |
| | | | | 705/45 |
| 2014/0195416 | A1* | 7/2014 | Linscott | G06Q 20/023 |
| | | | | 705/39 |
| 2014/0244514 | A1* | 8/2014 | Rodriguez | G06Q 20/227 |
| | | | | 348/150 |
| 2014/0288949 | A1* | 9/2014 | Eromo | G06Q 20/102 |
| | | | | 705/2 |
| 2015/0142545 | A1* | 5/2015 | Ceribelli | G06Q 30/0224 |
| | | | | 705/14.23 |
| 2015/0149314 | A1* | 5/2015 | Sears | G06Q 20/209 |
| | | | | 705/24 |
| 2015/0170126 | A1* | 6/2015 | Gleeson | G06Q 20/3821 |
| | | | | 705/21 |
| 2015/0178730 | A1* | 6/2015 | Gleeson | G06Q 20/3829 |
| | | | | 705/72 |
| 2016/0379185 | A1* | 12/2016 | Smith | G06Q 20/042 |
| | | | | 705/45 |
| 2017/0185972 | A1* | 6/2017 | Bozeman | G06Q 20/04 |
| 2017/0300957 | A1* | 10/2017 | Yoder | G06Q 30/06 |
| 2018/0240081 | A1* | 8/2018 | Doyle | G06Q 20/02 |
| 2019/0244248 | A1* | 8/2019 | Purves | G06Q 20/40145 |
| 2019/0378112 | A1* | 12/2019 | Grassadonia | G06Q 40/00 |
| 2019/0392410 | A1* | 12/2019 | Ceribelli | G06Q 20/0425 |
| 2020/0020002 | A1* | 1/2020 | Ceribelli | G06Q 20/102 |
| 2020/0082407 | A1* | 3/2020 | Clower | G07F 19/209 |
| 2020/0279231 | A1* | 9/2020 | Doyle | G06Q 40/00 |
| 2020/0294005 | A1* | 9/2020 | Stewart | G06Q 20/0425 |
| 2021/0112154 | A1* | 4/2021 | Rodriguez | H04M 1/72469 |
| 2021/0133706 | A1* | 5/2021 | Miller | G06Q 20/401 |
| 2021/0217039 | A1* | 7/2021 | Soon-Shiong | G06Q 20/387 |
| 2021/0256485 | A1* | 8/2021 | Fidanza | G06Q 30/0201 |
| 2022/0004925 | A1* | 1/2022 | Cella | G06Q 20/0655 |

* cited by examiner

COMPUTER-BASED SYSTEMS CONFIGURED FOR AUTOMATED ACTIVITY VERIFICATION BASED ON OPTICAL CHARACTER RECOGNITION MODELS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for automated activity verification, including automated comparisons of physical records with digital records to identify discrepancies.

BACKGROUND OF TECHNOLOGY

Reconciling physical records with electronic records can often be a long and laborious process. In many cases, a comparison between the physical records and the corresponding electronic records is needed to identify discrepancies between the physical and electronic versions of an activity record.

SUMMARY OF DESCRIBED SUBJECT MATTER

In some embodiments, the present disclosure provides an exemplary technically improved computer-based method that includes at least the following steps of receiving, by at least one processor, a digital image of a receipt from a receipt scanning tool associated with at least one user, where the receipt indicates transaction information includes: i) payee identification information associated with a receiver of a payment, ii) a payment amount associated with a user payment to the receiver, and iii) a payment date associated with the user payment to the receiver; utilizing, by the at least one processor, an optical character recognition model to encode a digital representation of the transaction information by encoding the transaction information into transaction data; extracting, by the at least one processor, a payee identification feature that represents the payee identification information based at least on the transaction data; extracting, by the at least one processor, an amount identification feature that represents the payment amount based at least on the transaction data; extracting, by the at least one processor, a payment date feature that represents the payment date based at least on the transaction data; generating, by the at least one processor, a receipt feature vector based at least on a combination of the payee identification feature, the amount identification feature and the payment date feature; receiving, by the at least one processor, a transaction history associated with a user account in a user account database, where the transaction history includes a plurality of historical transaction data items representing a plurality of transactions, where each respective historical transaction data item includes: i) a respective merchant code associated with a respective merchant of a respective transaction in the plurality of historical transaction data, ii) a respective payment code associated with a respective payment authorization of the respective transaction in the plurality of historical transaction data, and iii) a respective payment date code associated with the respective payment authorization; generating, by the at least one processor, a plurality of transaction feature vectors based at least on a combination of the respective merchant code, the respective payment code and the respective payment date code of each respective historical transaction data item, where each respective transaction feature vector of the plurality of transaction feature vectors is associated with each respective transaction of the plurality of historical transaction data items; utilizing, by the at least one processor, a prediction for a matching transaction representing a respective transaction from the plurality of historical transaction data items of the transaction history that matches the transaction information of the receipt based at least on the receipt feature vector and each of the plurality of respective transaction feature vectors; determining, by the at least one processor, a difference between the payment amount of the receipt and the respective payment authorization associated with the matching transaction based at least on a comparison between the transaction data encoded from the digital image of the receipt and the respective payment code associated with the matching transaction; causing to display, by the at least one processor, an alert on a screen of at least one computing device associated with the at least one user indicative of the difference; and performing, by the at least one processor, at least one corrective action to remedy the difference.

In some embodiments, the present disclosure provides an exemplary technically improved computer-based method that includes at least the following steps of generating, by at least one processor, a digital image of a receipt at a receipt scanning tool associated with at least one user, where the receipt indicates transaction information includes: i) payee identification information associated with a receiver of a payment, ii) a payment amount associated with a user payment to the receiver, and iii) a payment date associated with the user payment to the receiver; uploading, by at least one processor, the digital image of the receipt to at least one fraud detection processor; receiving, by the at least one processor, an alert indicative of an incorrect charge associated with the respective merchant of the matching transaction, where the at least one fraud detection processor is configured to: utilize an optical character recognition model to encode a digital representation of the transaction information by encoding the transaction information into transaction data; extract a payee identification feature that represents the payee identification information based at least on the transaction data; extract an amount identification feature that represents the payment amount based at least on the transaction data; extract a payment date feature that represents the payment date based at least on the transaction data; generate a receipt feature vector based at least on a combination of the payee identification feature, the amount identification feature and the payment date feature; receive a transaction history associated with a user account in a user account database, where the transaction history includes a plurality of historical transaction data items representing a plurality of transactions, where each respective historical transaction data item includes: i) a respective merchant code associated with a respective merchant of a respective transaction in the plurality of historical transaction data, ii) a respective payment code associated with a respective payment authorization of the respective transaction in the plurality of historical transaction data, and iii) a respective payment date code associated with the respective payment authorization; generate a plurality of transaction feature vectors based at least on a combination of the respective merchant code, the respective payment code and the respective payment date code of each respective historical transaction data item, where each respective transaction feature vector of the plurality of transaction feature vectors is associated with each respective transaction of the plurality of historical transaction data items; utilize a prediction for a matching transaction representing a respective transaction from the plurality of historical transaction data items of the transaction history that matches the transaction information of the receipt based at least on the receipt feature vector and each of the plurality of respective transaction feature vectors; determine a difference between the payment amount of the receipt and the respective payment authorization associated with the matching transaction based at least on a comparison between the transaction data encoded from the digital image of the receipt and the respective payment code associated with the matching transaction; and causing to display, by the at least one processor, the alert on a screen of at least one computing device associated with the at least one user indicative of the difference; and performing, by the at least one processor, at least one corrective action to remedy the difference.

In some embodiments, the present disclosure provides an exemplary technically improved computer-based system that includes at least the following components at least one account database configured to store a transaction history associated with each of at least one user account and at least one processor. The at least one processor is configured to implement instructions including: receive a digital image of a receipt from a receipt scanning tool associated with at least one user, where the receipt indicates transaction information includes: i) payee identification information associated with a receiver of a payment, ii) a payment amount associated with a user payment to the receiver, and iii) a payment date associated with the user payment to the receiver; utilize an optical character recognition model to encode a digital representation of the transaction information by encoding the transaction information into transaction data; extract a payee identification feature that represents the payee identification information based at least on the transaction data; extract an amount identification feature that represents the payment amount based at least on the transaction data; extract a payment date feature that represents the payment date based at least on the transaction data; generate a receipt feature vector based at least on a combination of the payee identification feature, the amount identification feature and the payment date feature; receive a transaction history associated with a user account in a user account database, where the transaction history includes a plurality of historical transaction data items representing a plurality of transactions, where each respective historical transaction data item includes: i) a respective merchant code associated with a respective merchant of a respective transaction in the plurality of historical transaction data, ii) a respective payment code associated with a respective payment authorization of the respective transaction in the plurality of historical transaction data, and iii) a respective payment date code associated with the respective payment authorization; generate a plurality of transaction feature vectors based at least on a combination of the respective merchant code, the respective payment code and the respective payment date code of each respective historical transaction data item, where each respective transaction feature vector of the plurality of transaction feature vectors is associated with each respective transaction of the plurality of historical transaction data items; utilize a prediction for a matching transaction representing a respective transaction from the plurality of historical transaction data items of the transaction history that matches the transaction information of the receipt based at least on the receipt feature vector and each of the plurality of respective transaction feature vectors; determine a difference between the payment amount of the receipt and the respective payment authorization associated with the matching transaction based at least on a comparison between the transaction data encoded from the digital image of the receipt and the respective payment code associated with the matching transaction; and cause to display an alert on a screen of at least one computing device associated with the at least one user indicative of the difference; and perform at least one corrective action to remedy the difference.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
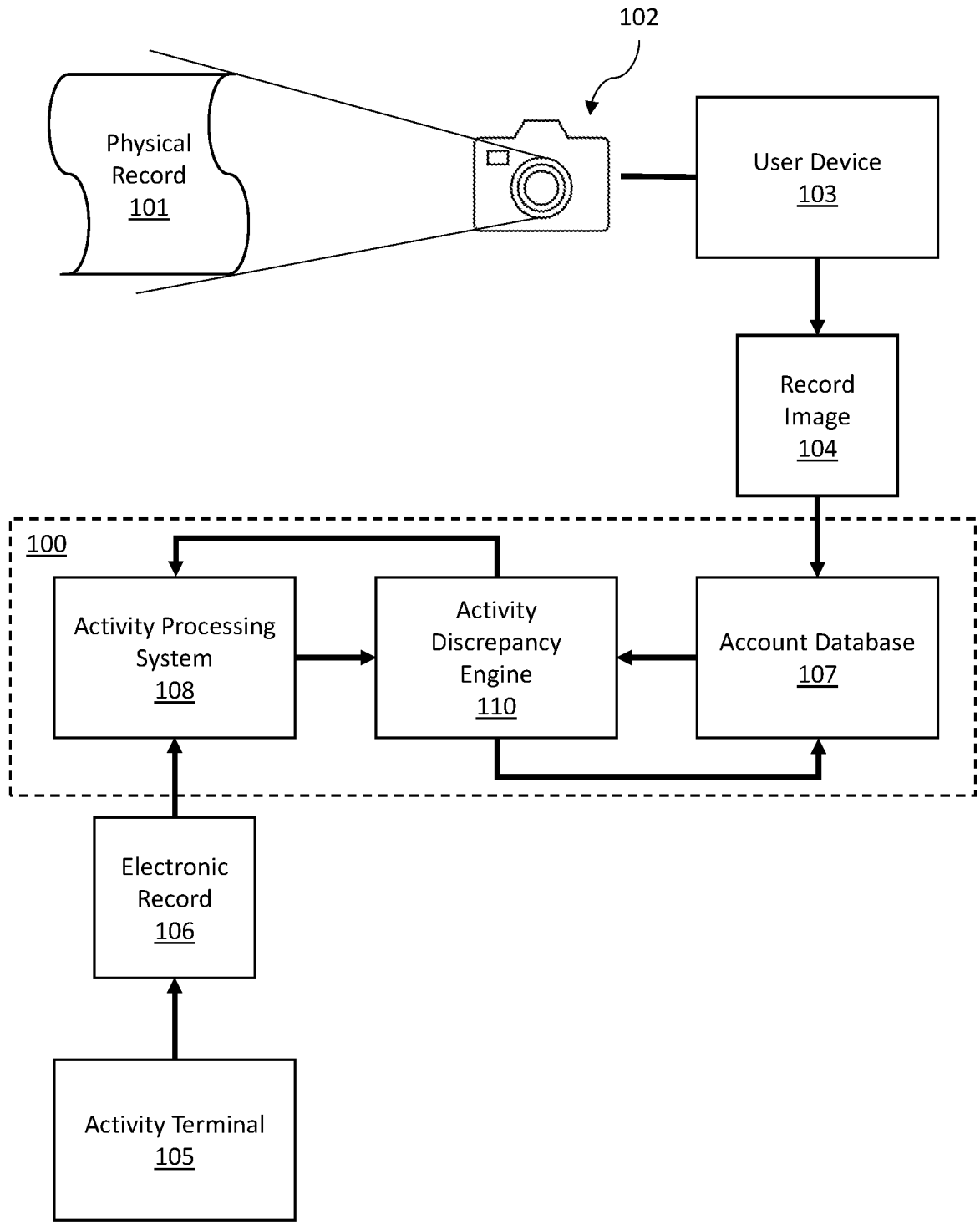
FIGS. 1-8 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of improving security and verification of activities such as financial transactions that automatically employs data from physical recordation of the activity. The following embodiments provide technical solutions and technical improvements that overcome technical problems, drawbacks and/or deficiencies in the technical fields involving transaction processing that requires transactions to post and appear in an account profile, and otherwise relies on data supplied by a separate system itemizing the transaction that is often incomplete or non-existent. As explained in more detail, below, technical solutions and technical improvements herein include aspects of improved activity verification that can automatically ingest an image of a physical transaction that supplements the electronic record, prior to or after processing and posting of the transaction such that discrepancies and errors may be detected without itemization data. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another exemplary computer-based system for automated activity verification in accordance with one or more embodiments of the present disclosure.

In some embodiments, a user may capture an image of a physical record 101 of an activity to verify an electronic record 106 reported by an activity terminal 105. In so doing, an activity management system 100 may automatically resolve any discrepancies between the physical record 101 and the electronic record 106 without a need for the activity terminal 105 to report any itemizations or additional details related to the activity, and without user input.

In some embodiments, a user may capture an image of a physical record 101 using an image capture device 102, such as, e.g., a digital imaging sensor in a camera, smartphone, tablet, or other user device 103. The capturing of the image includes generating a digital representation of the physical records 101 in, e.g., a record image 104, in a suitable image file format. For example, the image file may be in a lossy or lossless raster format such as, e.g., Joint Photographic Experts Group (JPEG), Tagged Image File Format (TIFF), Portable Network Graphics (PNG), Exchangeable image file format (Exif), Graphics Interchange Format (GIF), Windows bitmap (BMP), portable pixmap (PPM) or other formats from the Netpbm format family, WebP, High Efficiency Image File Format (HEIF), BAT, Better Portable Graphics (BPG), or a lossy or lossless vector format such as, Computer Graphics Metafile (CGM), Gerber (RS-274X), Scalable Vector Graphics (SVG), or other formats and combinations thereof. The file format of the record image 104 may depend on the image capture device 102, such as the format used by a digital camera or smartphone, which can vary from device to device.

In some embodiments, the record image 104 may be maintained in a data storage of the user device 103, either temporarily or persistently (e.g., for an extended period of time until a user selects to remove it). In some embodiments, the data storage may include, e.g., a suitable memory or storage solutions for providing electronic data to the user device 103 or account database 107, or both. For example, the data storage may include, e.g., a centralized or distributed database, cloud storage platform, decentralized system, server or server system, among other storage systems, or the data storage may include, e.g., a hard drive, solid-state drive, flash drive, or other suitable storage device, or the data storage may include, e.g., a random access memory, cache, buffer, or other suitable memory device, or any other data storage solution and combinations thereof.

In some embodiments, the user device 103, upon selection by a user or automatically (e.g., according to a scheduled upload time or period, or upon capturing of the record image 104 by the image capture device 102), may upload the record image 104 to an account database 107. In some embodiments, the account database 107 may include one or more data storage devices and/or systems, such as those described above. In some embodiments, the account database 107 maintains a record or account profiles for each user associated with the account database 107. Each account profile can include, e.g., user identification information, such as a name, account number, date of birth, among other information. Additionally, the account profile may include a record of activities related to the account of the account profile. For example, the account profile may include a record of transactions associated with a credit account, bank account, or other financial account. In some embodiments, the account profile includes the record, however in some embodiments, the account profile may include a link to the record that is maintained elsewhere, such as, e.g., elsewhere in the activity management system 100 or in a separate system, or both.

In some embodiments, the electronic record 106 may be uploaded form the activity terminal 105 to an activity processing system 108 to manage and process activities. In some embodiments, the account database 107 and the activity processing system 108 are both a part of the activity management system 100 for managing user activities in relation to user accounts, such as, e.g., managing financial transactions between user accounts and external accounts. In some embodiments, the activity terminal 105 may be associated with a user account of the activity processing system 108 and/or the account database 107, or the activity terminal 105 may be associated with an external account that is in communication with the activity processing system 108 and/or the account database 107. Thus, by uploading the electronic record 106 of the activity, the electronic record 106 associated an activity of the record image 104 may be provided to the activity management system 100.

In some embodiments, the electronic record 106 can include data identifying activity attributes. For example, the electronic record 106 can include, e.g., user identification data, such as, e.g., a name, account number, or other identifier, as well as date data identifying a date of the activity, a party identifying one or more additional parties associated with the activity, quantity data identifying a quantity of actions taken or a quantity of one or more items subject to the activity, among other data. For example, the activity may include a credit card transaction such that the electronic record 106 is a record uploaded by a credit card processing terminal and includes an account number of a payer, an identifier of a payee, a date of the transaction, an identifier of the item, items or services purchased, a tip amount, among other information. However, in many instances, the activity terminal 105 may upload incomplete or incorrect information, or information formatted incorrectly such that the activity processing system 108 cannot accurately determine the attributes of the activity.

Accordingly, in some embodiments, the attributes in the account profile in the account database 107 extracted from the record image 104 can be compared with the attributes provided to the activity processing system 108 by an activity discrepancy engine 110 to determine any discrepancies. Such discrepancies can be indicative of errors in the data, or of fraud at the activity terminal 105. Thus, the activity discrepancy engine 110 can identify when the electronic record 106 and the record image 104 of the physical record 101 differ, thus indicating foul play. The activity discrepancy engine 110 can perform this analysis without input or influence form the user, thus providing an automatic mechanism for identifying fraud. Moreover, the fraud may be detected before the activity processing system 108 completes processing of the electronic record 106, thus before any effect is imposed on the associated account profile of the user. For example, credit card payments and other payments often take time to "post" (e.g., process and effectuate a transfer of funds). Identifying inappropriate, fraudulent, mistaken, or otherwise incorrect transactions prior to posting can reduce processing related to completing the transaction and then undoing the transaction, as well as facilitate quick and accurate recovery of account funds, thus improving fraud mitigation.

For example, the activity discrepancy engine 110 can automatically identify fraudulent tip reporting at the activity terminal 105 by comparing the amounts of corresponding electronic records 106 and record images 104. In many cases, the activity terminal 105 may not identify a tip amount and simply report a total transaction amount. Thus, systems that rely on analyzing the reported tip amount to deduce fraud would be unable to identify misreported, e.g., fraudulent, tips in electronic records 106. The activity discrepancy engine 110, however, solves this problem by using the record image 104 of the physical record 101.

In some embodiments, the activity discrepancy engine 110 may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 2:
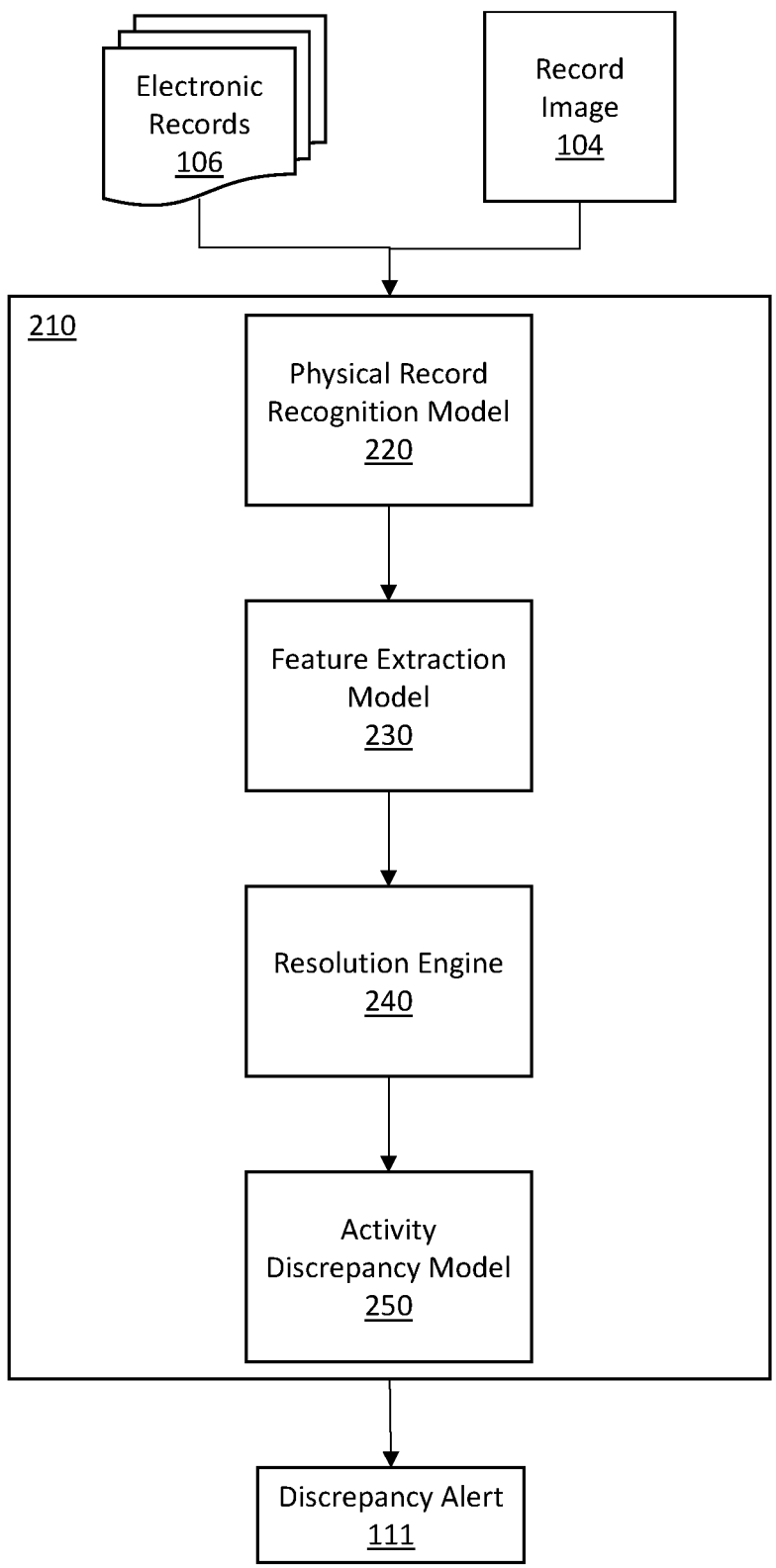

FIG. 2 is a block diagram of an activity discrepancy engine of another exemplary computer-based system for automated activity verification in accordance with one or more embodiments of the present disclosure.

In some embodiments, electronic records 106 of activities as well as digital representations of the corresponding physical records, e.g., record images 104, may be provided to the activity discrepancy engine 210. In some embodiments, the activity discrepancy engine 210 can include hardware and software components for analyzing the records and resolving any discrepancies.

As used herein, the terms "model," "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the records are provided to a number of engines and models, each configured to transform the records to facilitate identifying and resolving discrepancies and ensure an accurate record of each activity is enforced.

In some embodiments, the activity discrepancy engine 210 includes a physical record recognition model 220. The physical record recognition model 220 receives the record image 104 and is configured to recognize the contents recorded therein. For example, the physical record recognition model 220 may employ, e.g., optical character recognition (OCR) to encode a digital representation of the activity information recorded by the physical record. In some embodiments, the physical record recognition model 220 encode the information identifying within the record image 104 each character printed on the physical record and recording each character into activity data.

In some embodiments, the activity data representing, e.g., the characters depicted in the record image 104 of the physical records, may be provided to a feature extraction model 230. In some embodiments, the feature extraction model 230 analyzes the characters and extracts pertinent data related to the details of the activity, including, e.g., parties involved in the activity, a date of the activity, an item, service, act or quantity related to the activity, among other information and combinations thereof. For example, in some embodiments, the feature extraction model 230 may identify and extract a payee identification feature that represents payee identification information in, e.g., a transaction. Similarly, the feature extraction model 230 may identify and extract a payee identification feature that represents the payee identification information in, e.g., the transaction, as well as an amount identification feature that represents the payment amount, a payment date feature that represents the payment date, among other features related to a transaction or other recorded activity.

In some embodiments, the features may be passed to a resolution engine 240 to match the activity of the record image 104 to an activity of electronic records 106 in an activity history. However, in some embodiments, prior to communicating the features to the resolution engine 240, the feature extraction model 230 may generate a feature vector or feature map that encodes the feature into a data structure for analysis by the resolution engine 240. For example, the feature extraction model 230 may generate a receipt feature vector based at least on a combination of the payee identification feature, the amount identification feature and the payment date feature to generate an input data structure for use by the resolution engine 240.

In some embodiments, the resolution engine 240 may receive an activity history including the electronic records 106 of activities, among other electronic records. Using the electronic records 106 from the activity history and the activity data from the record image 104, the resolution engine 240 may match the activity data of the physical record to an electronic record 106 in the activity history. For example, the activity history may be a history for a user's account, e.g., in an account database 107 as processed by the activity processing system 108, and each electronic record 106 pertains to a particular activity associated with that user.

In some embodiments, the resolution engine 240 uses the features of the activity data associated with the parties involved in the activity and the date, among other data, to match the record image 104 to an electronic record 106 of the electronic records 106 that records the same activity as the physical record represented in the record image 104. For example, each electronic record 106 may include data identifying one or multiple parties associated with the activity, an activity identifier identifying, e.g., a particular activity or activity type, date data identifying a date on which the activity occurred (e.g., commenced, concluded, or range of dates from commencement to conclusion), among other possible identifying information to identify a particular activity. For example, where the activity is a transaction where the user paid a payee, the electronic records 106 may each include transaction data including, e.g., a merchant code associated with a payee in the transaction, a payment code associated with a payment authorization by the user to the payee in the transaction, and a payment date code associated with the payment authorization.

In some embodiments, the resolution engine 240 may filter the electronic records 106 according to time in order to more efficiently resolve the record image 104 with the corresponding electronic record 106. For example, the resolution engine 240 may only select from electronic records 106 having a date within, e.g., one day, two days, three days, one week, or other period within which the record image 104 was uploaded and/or received. In some embodiments, to more efficiently and accurately identify incorrect electronic records 106 that have not completed processing by the activity processing system 108, e.g., to find incorrect records before enforcement of the records, the resolution engine 240 may compare the activity data form the record image 104 to the electronic records 106 that in the process of being processed by the activity processing system 108. In some embodiments, the resolution engine 240 compares the activity data form the record image 104 to processing electronic records 106 first, and then, if no match is found, comparing the activity data to electronic records 106 that have completed processing. For example, the resolution engine 240 may compare transaction data of the record image 104 to electronic records 106 of processing or pending transactions before comparing to posted transactions. In some embodiments, the resolution engine 240 may be configured to only check pending or only posted transactions. Other configurations are also contemplated.

In some embodiments, the resolution engine 240 may compare the activity data of the record image 104 to data of each electronic record 106 by, e.g., generating feature vectors or feature maps encoding the data of each electronic record 106, similar to the activity feature vector or map described above. However, in some embodiments, the resolution engine 240 may compare the activity data form the record image and the data from the electronic records 106 as separate data items for each of the attributes of the activity (e.g., parties, activity type or activity identifier, activity date, etc.).

In some embodiments, the resolution engine 240 may utilize the feature vectors or feature maps form the record image 104 and each of the electronic records 106 to match the physical record of an activity to an electronic record 106 for that activity using a machine learning model. In some embodiments, the machine learning model can be used to formulate a prediction for a matching activity represented by a corresponding electronic record 106 that matches the activity data of the physical record based at least on the activity data feature vector or map from the record image 104 and each of the electronic record 106 feature vectors or maps. In some embodiments, the prediction can include a probability score of a match between the record image 104 and each electronic record 106, such that the resolution engine 240 may select the highest probability match as the predicted match for corresponding records of the activity.

In some embodiments, an activity discrepancy model 250 may receive the matching records, including, e.g., the activity data form the record image 104 and the data from the matching electronic record 106, and determine any discrepancy in how the activity is recorded. For example, where the activity is a financial transaction, the activity discrepancy model 250 may compare the transaction amount data represented in each of the record image 104 and the matching electronic record 106 to determine if both records include the same transaction amount. However, discrepancies in recordation of other activities may be analyzed, such as, e.g., document filings, identity management and security, or other activities where an aspect of a physical document may be used to verify an electronic record (e.g., proof of identity or proof of action).

In some embodiments, where the activity discrepancy model 250 identifies a discrepancy between the activity attributes of the matching electronic record 106 and the physical record represented in the record image 104, the activity discrepancy model 250 may issue a discrepancy alert 111. In some embodiments, the discrepancy alert 111 can include, e.g., a notification (audible, visual, text based, or other notification) via a suitable communication medium (e.g., email, phone call, text message, internet chat, application notification, or other) to the user or to the recording entity (e.g., bank, credit union, broker, merchant, government office, or other). In some embodiments, the discrepancy alert 111 may automatically cause the matching electronic record 106 to be flagged with a suitable data flag for review by personnel or to stop enforcement or recordation of the activity associated with the matching electronic record 106, or both. Thus, incorrect activity information in the electronic records 106 may be quickly and efficiently identified and remedy, even when the activity has not completed processing or validation by, e.g., the activity processing system 108.

For example, the discrepancy alert 111 may cause to display an alert on a screen of a computing device associated with the user, where the alert is indicative of the discrepancy.

For example, the discrepancy alert 111 may cause the performance of corrective action to remedy the difference, such as, e.g., placing a hold on a pending transaction prior to a posting of the matching transaction responsive to the difference between a payment amount associated with the physical record and a respective payment authorization associated with the matching electronic record 106. In the case of a posted transaction, for example, the discrepancy alert 111 may cause a fraud record to be generated in a fraudulent authorization log that indicates the difference between the payment amount associated with the physical record and the matching electronic record 106. In some embodiments, the fraudulent authorization log may store fraud records associated with an account of the user associated with activity of the physical record depicted in the record image 104. In some embodiments, each fraud record may include comprises at least one respective additional difference between at least one respective payment amount associated with at least one respective additional receipts and respective payment authorizations associated with at least one additional matching transactions that match the at least one respective additional receipts.

In some embodiments, depending on a number of discrepancy alerts 111 issued for an account, the activity discrepancy engine 210 may place a hold on the account. For example, the activity discrepancy engine 210 and activity discrepancy model 250 may maintain a count of discrepancy alerts 111 issued for each account, and upon the count exceeding a threshold within a period of time, e.g., three, four, five or ten discrepancy alerts 111 per week or per month, the activity discrepancy model 250 may place a hold on the account such that no further electronic records 106 may be enforced against the account until further verification is performed.

In some embodiments, the activity discrepancy model 250 may record the discrepancies, including the activity discrepancy and the associated electronic record or record 106 and the associated physical record represented by the record image 104. Thus, activity discrepancies may be detected and recorded, e.g., in a user account of the account database 107 for each activity in that account for which a discrepancy has been detected.

Figure 3:
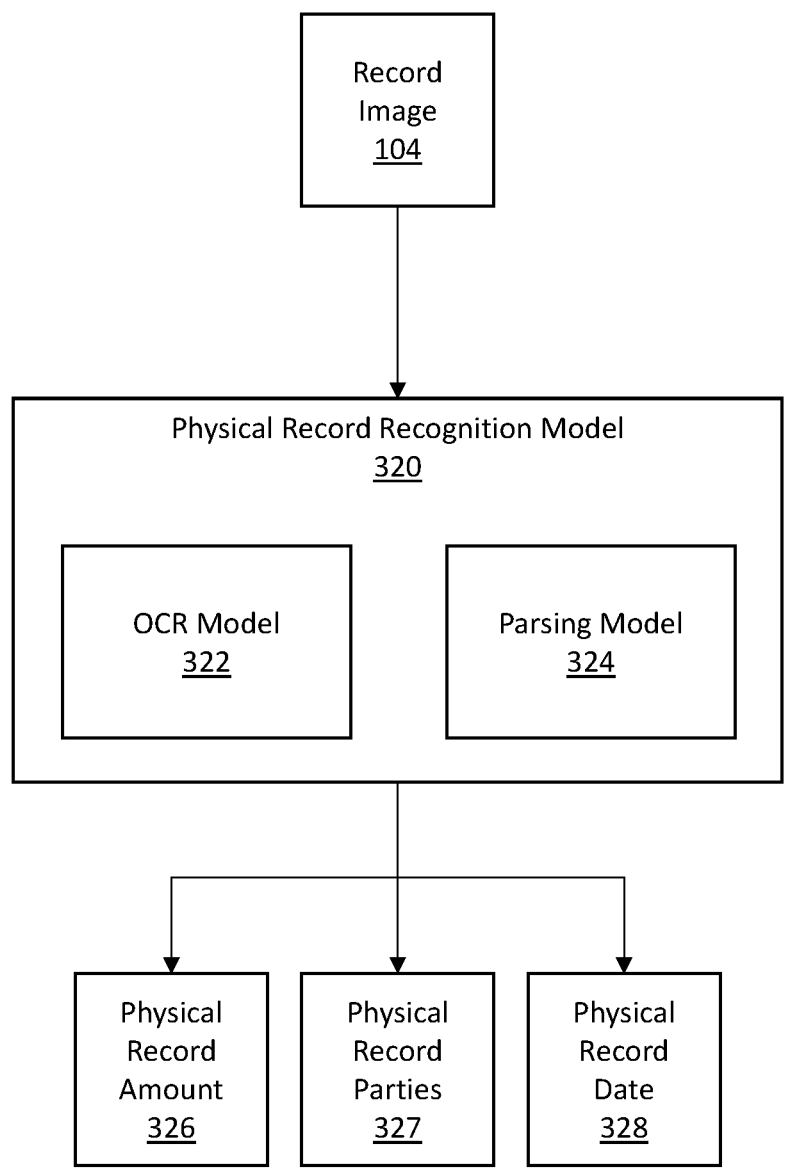

FIG. 3 is a block diagram of a physical record recognition model of another exemplary computer-based system for automated activity verification in accordance with one or more embodiments of the present disclosure.

In some embodiments, a physical recognition model 320 may determine a physical record amount 326, physical record parties 327 and a physical record date 328 specified in a physical record as represented in a record image 104. In some embodiments, the physical recognition model 320 employs an OCR model 322 to identify alphanumeric characters represented in the record image 104, and a parsing model 324 to recognize sequences of the alphanumeric characters as information of interest, including, e.g., amounts, dates, parties or entities listed, locations associated with the parties or activity or both, among other information serving to record details of an activity.

In some embodiments, the OCR model 322 receives the record image 104 and generates a file representing sequences of alphanumeric characters, or other characters, depicted therein. In some embodiments, the OCR model 322 may employ a library of characters and match the characters in the library to shapes in the record image 104. Where the shapes match, a character is identified. In some embodiments, the matching may be facilitated by or replaced with a machine learning model for, e.g., typed and handwritten character recognition. For example, the OCR model 322 may decompose shapes in the record image 104 into "features," such as, e.g., lines, closed loops, line direction, and line intersections to reduce the dimensionality of the representation for computationally efficient OCR. The features may then be compared with an vector representation of each character in the library to identify a match. In some embodiments, the OCR model 322 may utilize a machine learning technique, such those described above, including, e.g., computer vision techniques such as nearest neighbor classifiers (e.g., k-nearest neighbors) or other techniques and combinations thereof.

In some embodiments, the OCR model 322 may, therefore, produce data representing the sequences of characters depicted in the record image 104. However, to identify words or phrases, a parsing model 324 may analyze the sequences to identify attributes of the activity recorded in the physical record. Thus, the parsing model 324 may ingest the unstructured recognized characters and generate structured and machine readable data.

In some embodiments, the parsing model 324 may compare words and phrases from a library of words and phrases to the sequences of characters. For example, a five letter word may be compared to each five character sequence of characters with a sequence of characters. In some embodiments, the library of words and phrases reduce computation resources by including words and phrases of interest, such as, e.g., words and phrases that are pre-determined to be indicative of parties, activities, dates, amounts, locations, etc. However, in some embodiments, it may be difficult to compile a library of all words and phrases of interest. Thus, the parsing model 324 may, alternatively or in combination with the library, employ a machine learning model to recognize and identify language.

In some embodiments, the parsing model 324 employs a suitable classifier to classify sequences of characters as words or phrases related to, e.g., a name, a date, a location, a quantity, a currency, or other type of information. The sequence of characters associated with each classification may then be extracted as the identifier associated with that classification. For example, the classifier may classify a sequence of characters as a date such that the parsing model 324 outputs the sequence as a date of the activity to produce the physical record date 328. A similar technique may be employed for each of the physical record amount 326 and the physical record parties 327. In some embodiments, the parsing model 324 may employ any suitable classifier, such as, e.g., a convolutional neural network or other neural network, a naïve Bayes classifier, maximum entropy models, multinomial logistic regression, gated recurrent units, recurrent neural networks, Markov models, conditional random fields, among others and combinations thereof.

Figure 4:
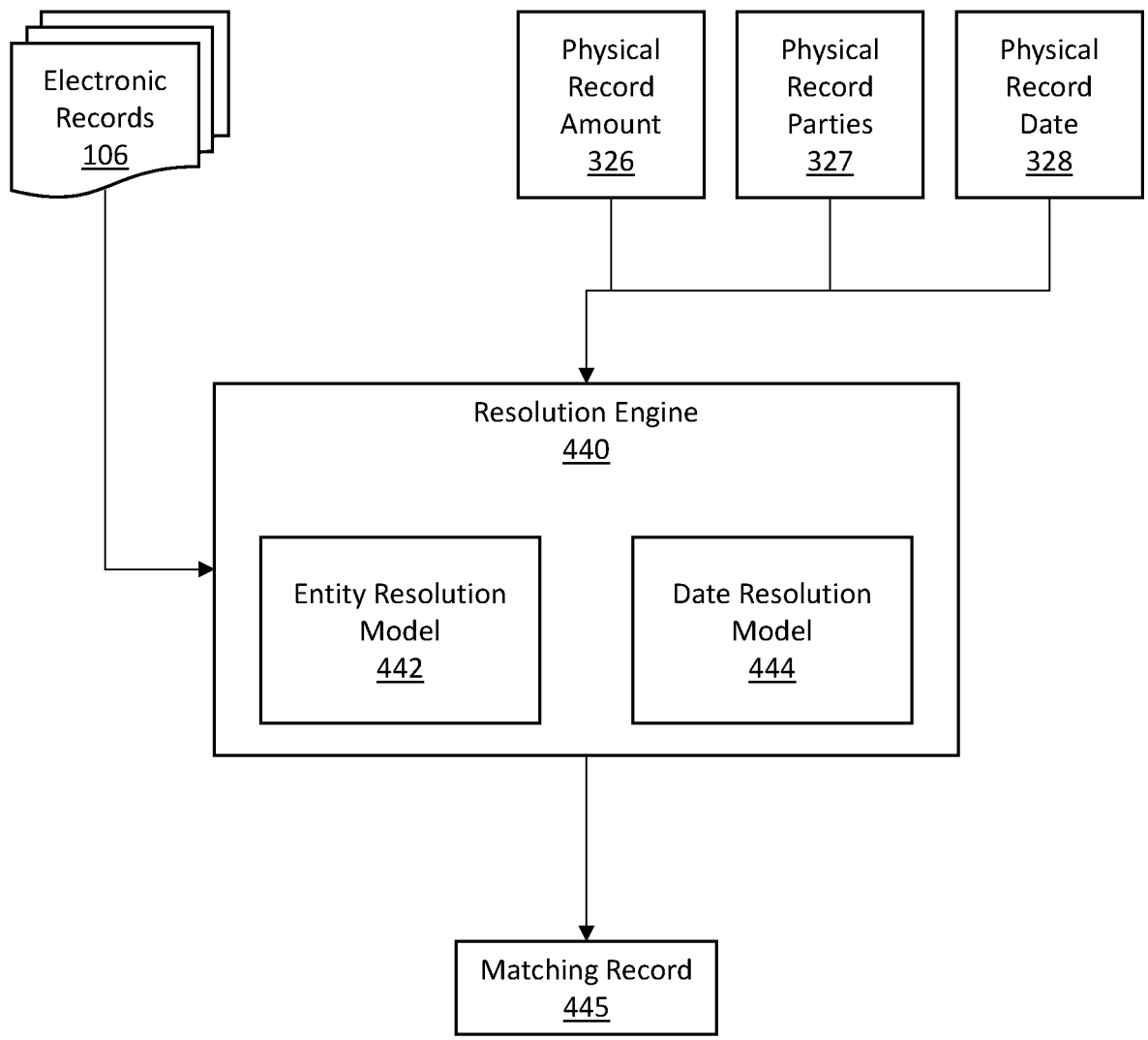

FIG. 4 is a block diagram of a resolution engine of another exemplary computer-based system for automated activity verification in accordance with one or more embodiments of the present disclosure.

In some embodiments, the physical record amount 326, the physical record parties 327 and the physical record date 328 may be ingested by a resolution engine 440, such as the resolution engine 240 described above, to determine a matching electronic record of a set of electronic records 106. In some embodiments, the resolution engine 440 utilizes an entity resolution model 442 to identify a subset of electronic records 106 having an entity that matches the physical record parties 327, and a date resolution model 444 to further reduce the subset of electronic records 106 to identify electronic records of the subset that indicate a date matching the physical record date 328. In some embodiments, additional models may be employed to match additional attributes of the physical record, such as, e.g., the amount, the location, or other attribute.

In some embodiments, the electronic records 106 may include data representing, e.g., a date, each party involved in the activity, an activity identifier, a location, an amount or quantity associated with the activity, among other attributes. However, depending on the terminal reporting the activity, the attributes may be of any number of formats. For example, the date may be formatted as mm/dd/yyyy, dd/mm/yyyy, mm/dd/yy, dd/mm/yy, mm-dd-yy, mm.dd.yy, yyymmdd, or any other format. As such, the physical record date 328 may not conform to the same format as the date indicated in the electronic records 106. Similarly, the physical record parties 327 and physical record amount 326 may be recorded in different formats form the electronic records 106. Thus, the entity resolution model 442 may utilize, e.g., an algorithm trained to recognize data having any number of formats, such as, e.g., a classifier trained to classify a first name, a last name, a business name, a merchant name, a merchant identification code, or other entity identifier regardless of the format of the associated record.

In some embodiments, to facilitate matching records, a feature extraction model 230 as described above, pre-processes the electronic records 106, the physical record image 104 attributes (e.g., the physical record amount 326, physical record parties 327 and physical record date 328), or both to generate or extract features representative of characteristics of each record, as described above. The features may, therefore, characterize quantitatively the data representing an entity identified within the respective records (e.g., a user, merchant, organization, or other entity).

In some embodiments, the entity resolution model 442 may then quantify a similarity between each electronic record of the electronic records 106 and the physical record attributes based on the extracted features. In some embodiments, the features are handcrafted to be tailored for use with the type of records included in each of the electronic records 106 and the record image 104, such as, e.g., transaction and merchant records, respectively. In some embodiments, the features include semantic features, such as, e.g., names, descriptions, location descriptions, among other semantic features. In some embodiments, the features may include quantitative features, such as, e.g., dates, location measurements, phone numbers, among others.

In some embodiments, a table or other representation of features of potentially matching records may be generated to correlate first data entity features with the associated first source records and second data entity features with the associated second source records to quantify each entity represented therein. In some embodiments, the table may then be stored in, e.g., a database or a storage, such as, e.g., the memory, or a local storage of the entity resolution model 442.

In some embodiments, the entity resolution model 442 may utilize the electronic record 106 entity feature vectors and the physical record parties 327 feature vector to resolve entity matches. In some embodiments, the entity resolution model 442 utilizes a machine learning model to compare the electronic record 106 entity feature vectors and the physical record parties 327 feature vector to generate a probability of a match. Thus, in some embodiments, the entity resolution model 442 utilizes, e.g., a classifier to classify entities and matches based on a probability. In some embodiments, the classifier may include, e.g., random forest, gradient boosted machines, neural networks including convolutional neural network (CNN), among others and combinations thereof. Indeed, in some embodiments, a gradient boosted machine of an ensemble of trees is utilized. Such models may capture a non-linear relationship between transactions and merchants, thus providing accurate predictions of matches. In some embodiments, the classifier may be configured to classify a match where the probability of a match exceeds a probability of, e.g., 90%, 95%, 97%, 99% or other suitable probability based on the respective data entity feature vectors. In some embodiments, each electronic record 106 matching to the physical record parties 327 may be represented in, e.g., a table, list, or other entity resolution data structure. For example, the entity resolution model 442 may produce a list having each entity matching electronic record 106.

In some embodiments, the list of potentially matching electronic records 106 may then be provided to the date resolution model 444. In some embodiments, the entity resolution model 442 may utilize the electronic record 106 date feature vectors and the physical record date 328 feature vector to resolve date matches. In some embodiments, similar to the entity resolution described above, the date resolution model 444 utilizes a machine learning model to compare the electronic record 106 date feature vectors and the physical record date 328 feature vector to generate a probability of a match based on a similarity of a date indicated in each electronic record 106 in the list of entity matching electronic records 106 to the date represented by the physical record date 328, utilizing, e.g., similar classifiers to those described above.

In some embodiments, the electronic record 106 in the list of entity matching electronic records having the highest probability of a date match may then be selected as the matching record 445. Thus, the resolution engine 440 may produce a matching record 445 of the electronic records 106 with which to assess a discrepancy according to the information represented in the physical record (e.g., the physical record amount 326). Thus, the physical record may be automatically uploaded and compared with each electronic record 106 of an activity associated with a user to cross-reference the activity attributes reported by the activity terminal, thus ensuring any fraud or mistakes are detected, even before enforcement of the recorded activity is attempted.

Figure 5:
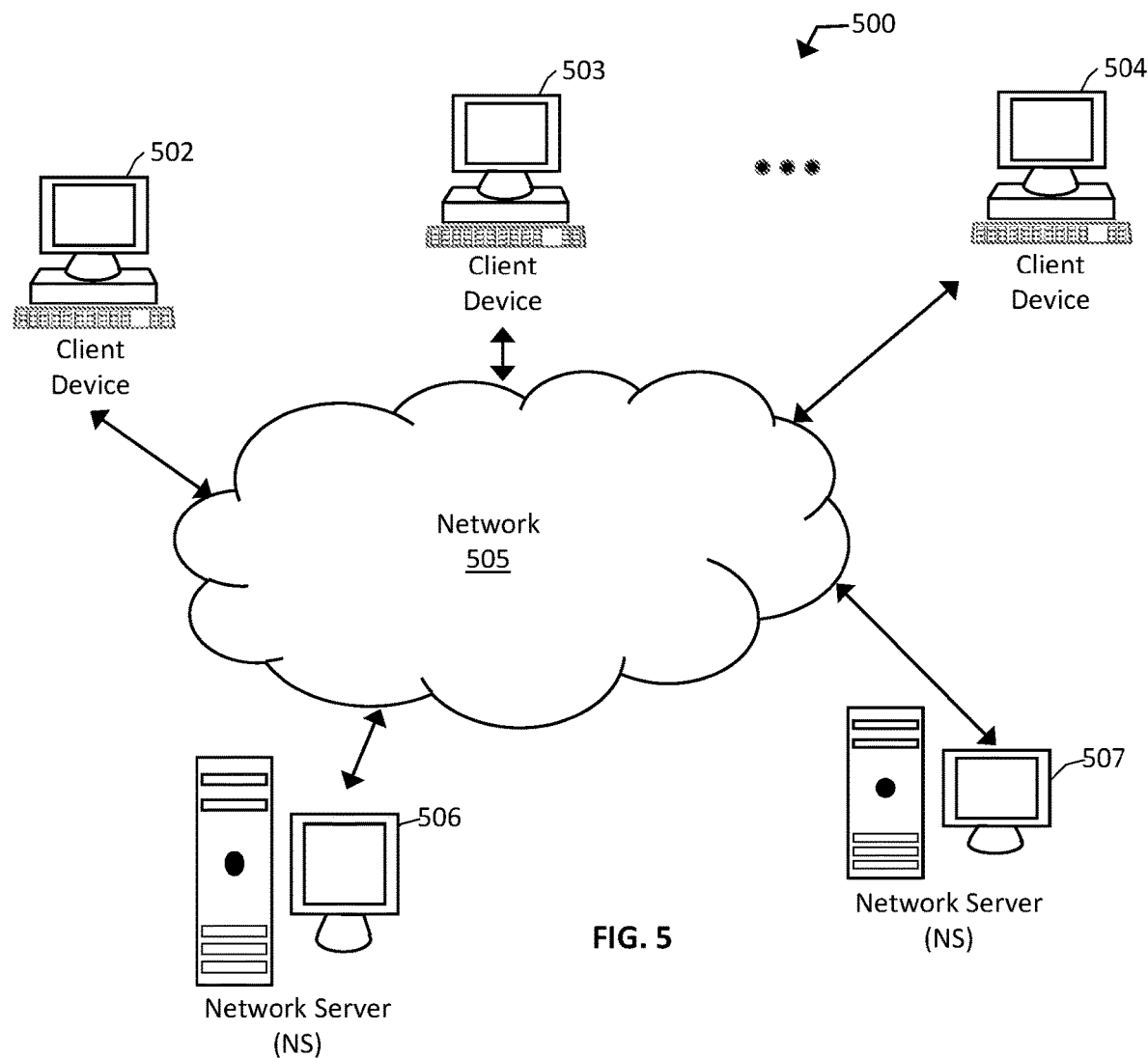

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
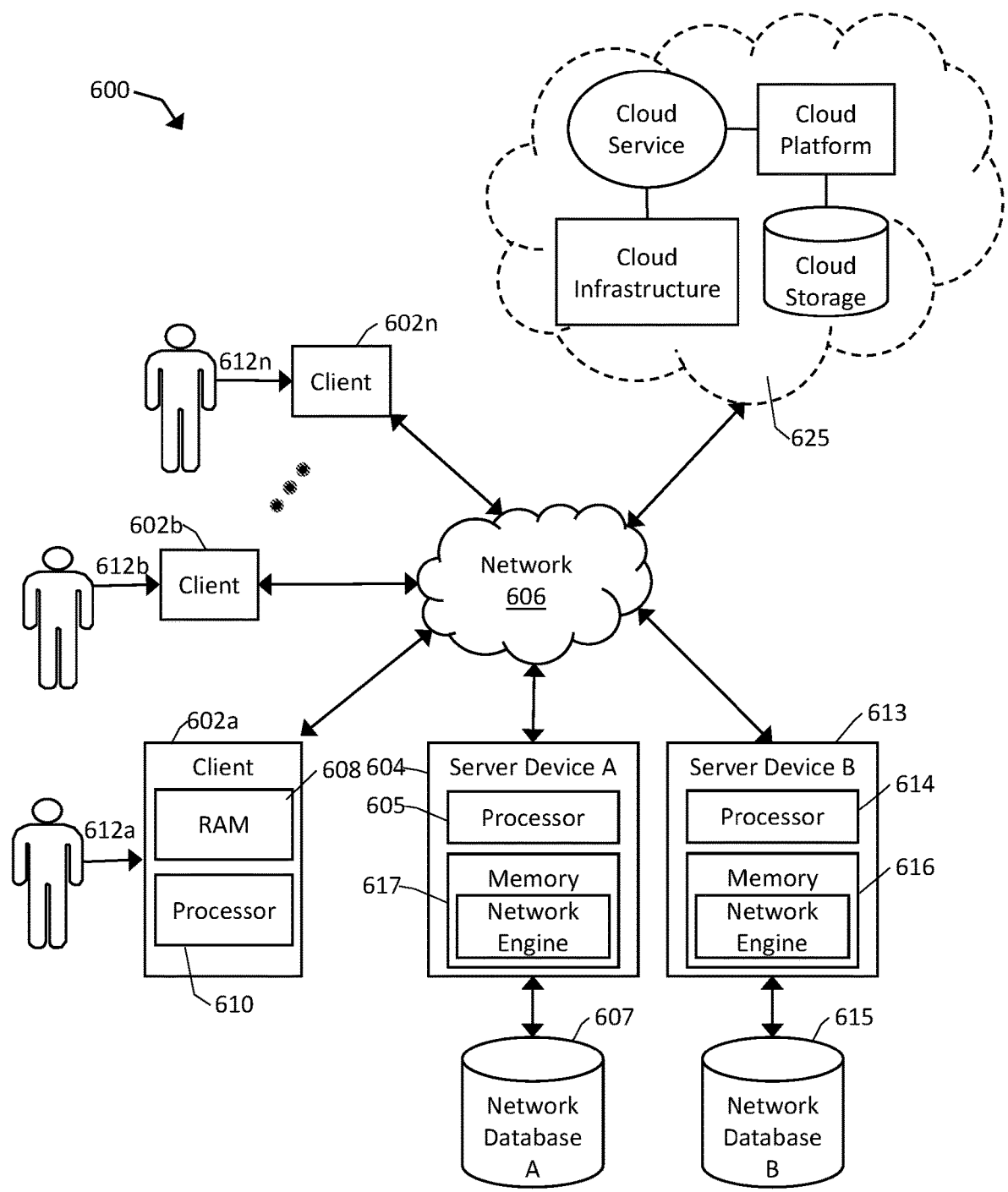

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
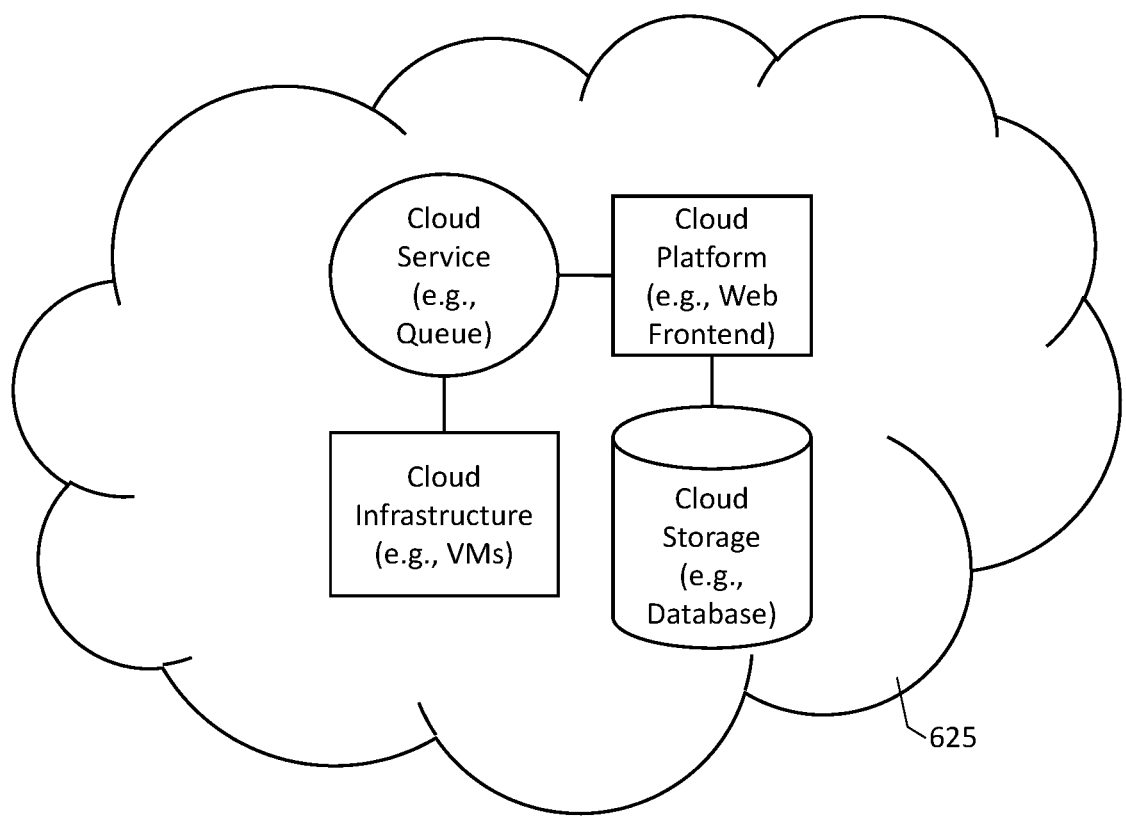
Figure 8:
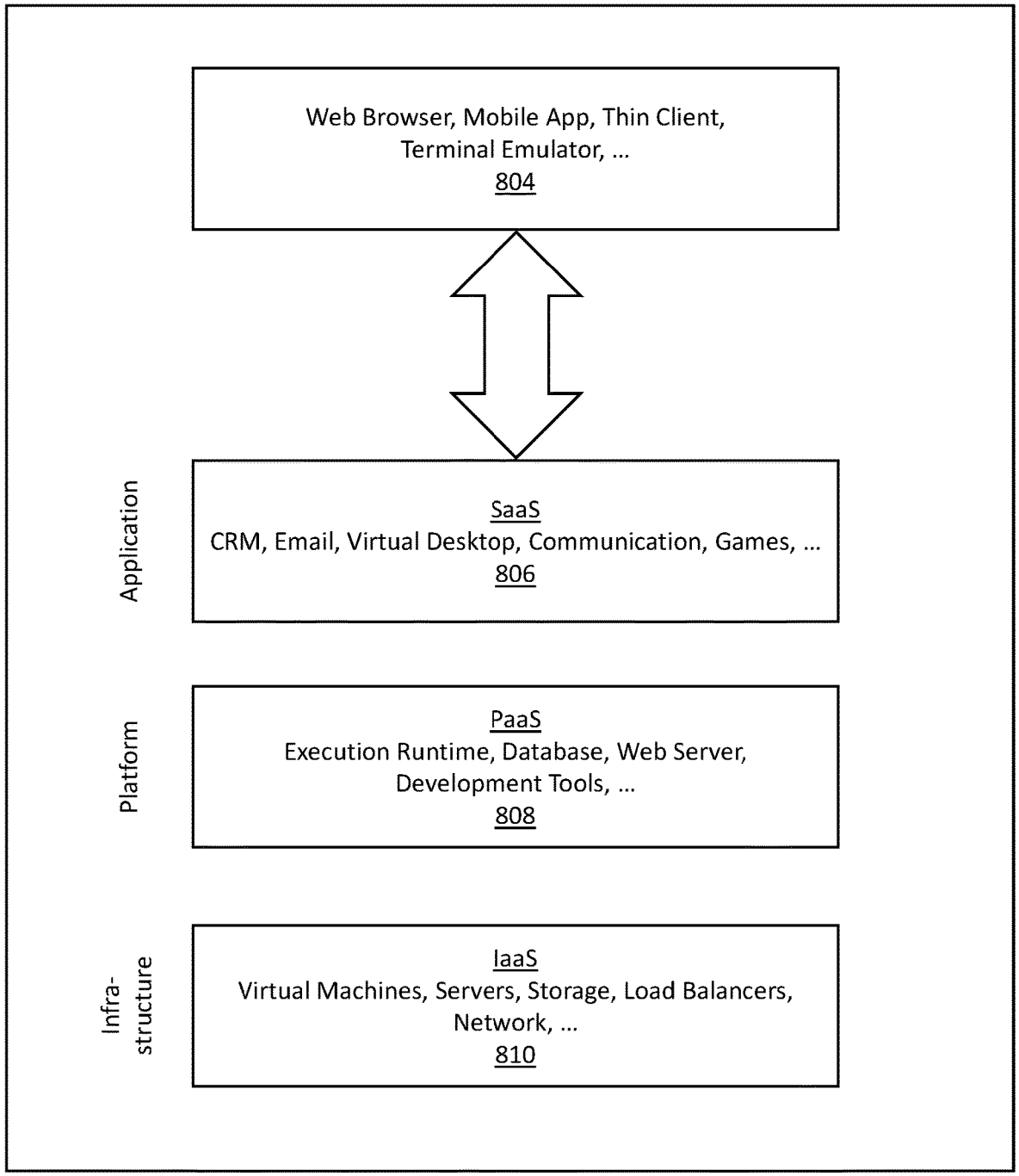

In some embodiments, the illustrative computer-based systems or platforms of the present disclosure may be specifically configured to operate in a cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the illustrative computer-based systems or platforms of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMID-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A method, comprising:
    receiving, by at least one processor, a digital image of a receipt from a receipt scanning tool associated with at least one user;
    wherein the receipt indicates transaction information comprises:
        i) payee identification information associated with a receiver of a payment,
        ii) a payment amount associated with a user payment to the receiver, and
        iii) a payment date associated with the user payment to the receiver;
    utilizing, by the at least one processor, an optical character recognition model to encode a digital representation of the transaction information by encoding the transaction information into transaction data;
    extracting, by the at least one processor, a payee identification feature that represents the payee identification information based at least on the transaction data;
    extracting, by the at least one processor, an amount identification feature that represents the payment amount based at least on the transaction data;
    extracting, by the at least one processor, a payment date feature that represents the payment date based at least on the transaction data;
    generating, by the at least one processor, a receipt feature vector based at least on a combination of the payee identification feature, the amount identification feature and the payment date feature;
    receiving, by the at least one processor, a transaction history associated with a user account in a user account database;
        wherein the transaction history comprises a plurality of historical transaction data items representing a plurality of transactions;
    wherein each respective historical transaction data item comprises:
        i) a respective merchant code associated with a respective merchant of a respective transaction in the plurality of historical transaction data,
        ii) a respective payment code associated with a respective payment authorization of the respective transaction in the plurality of historical transaction data, and
        iii) a respective payment date code associated with the respective payment authorization;
    generating, by the at least one processor, a plurality of transaction feature vectors based at least on a combination of the respective merchant code, the respective payment code and the respective payment date code of each respective historical transaction data item;
        wherein each respective transaction feature vector of the plurality of transaction feature vectors is associated with each respective transaction of the plurality of historical transaction data items;
    utilizing, by the at least one processor, a prediction for a matching transaction representing a respective transaction from the plurality of historical transaction data items of the transaction history that matches the transaction information of the receipt based at least on the receipt feature vector and each of the plurality of respective transaction feature vectors;
    determining, by the at least one processor, a difference between the payment amount of the receipt and the respective payment authorization associated with the matching transaction based at least on a comparison between the transaction data encoded from the digital image of the receipt and the respective payment code associated with the matching transaction;
    causing to display, by the at least one processor, an alert on a screen of at least one computing device associated with the at least one user indicative of the difference; and
    performing, by the at least one processor, at least one corrective action to remedy the difference.

2. The method of clause 1, wherein the transaction history comprises the plurality of historical transaction data items from a prior one day relative to a day associated with the receiving of the digital image.

3. The method of clause 1, wherein the transaction history comprises the plurality of historical transaction data items from a current day relative to a day associated with the receiving of the digital image.

4. The method of clause 1, wherein the plurality of historical transaction data items is associated with a plurality of pending transactions.

5. The method of clause 4, further comprising generating, by the at least one processor, a hold on the matching transaction prior to a posting of the matching transaction responsive to the difference between the payment amount associated with the receipt and the respective payment authorization associated with the matching transaction.

6. The method of clause 1, wherein the plurality of historical transaction data items is associated with a plurality of posted transactions.

7. The method of clause 1, further comprising generating, by the at least one processor, a fraud record of the difference between the payment amount associated with the receipt and the respective payment authorization associated with the matching transaction in a fraudulent authorization log;
wherein the fraudulent authorization log comprises at least one fraud record associated with an account associated with the at least one user;
wherein the at least one fraud record comprises at least one respective additional difference between at least one respective payment amount associated with at least one respective additional receipts and respective payment authorizations associated with at least one additional matching transactions that match the at least one respective additional receipts.

8. The method of clause 7, further comprising:
determining, by the at least one processor, a number of the plurality from fraud records in the fraudulent authorization log; and
generating, by the at least one processor, an account hold preventing payments from an account associated with the at least one user upon the number of the plurality of fraud records exceeding a threshold.

9. The method of clause 8, wherein the threshold comprises about 10.

10. The method of clause 1, further comprising generating, by the at least one processor, a fraud record of the difference between the payment amount associated with the receipt and the respective payment authorization associated with the matching transaction in a fraudulent authorization log;
wherein the fraudulent authorization log comprises at least one fraud record associated with the respective merchant;
wherein the at least one fraud record comprises at least one respective additional difference between at least one respective payment amount associated with at least one respective additional receipts and respective payment authorizations associated with at least one additional matching transactions that match the at least one respective additional receipts.

11. A method comprising:
generating, by at least one processor, a digital image of a receipt at a receipt scanning tool associated with at least one user;
wherein the receipt indicates transaction information comprises:
i) payee identification information associated with a receiver of a payment,
ii) a payment amount associated with a user payment to the receiver, and
iii) a payment date associated with the user payment to the receiver;
uploading, by at least one processor, the digital image of the receipt to at least one fraud detection processor;
receiving, by the at least one processor, an alert indicative of an incorrect charge associated with the respective merchant of the matching transaction;
wherein the at least one fraud detection processor is configured to:
utilize an optical character recognition model to encode a digital representation of the transaction information by encoding the transaction information into transaction data;
extract a payee identification feature that represents the payee identification information based at least on the transaction data;
extract an amount identification feature that represents the payment amount based at least on the transaction data;
extract a payment date feature that represents the payment date based at least on the transaction data;
generate a receipt feature vector based at least on a combination of the payee identification feature, the amount identification feature and the payment date feature;
receive a transaction history associated with a user account in a user account database;
wherein the transaction history comprises a plurality of historical transaction data items representing a plurality of transactions;
wherein each respective historical transaction data item comprises:
i) a respective merchant code associated with a respective merchant of a respective transaction in the plurality of historical transaction data,
ii) a respective payment code associated with a respective payment authorization of the respective transaction in the plurality of historical transaction data, and
iii) a respective payment date code associated with the respective payment authorization;
generate a plurality of transaction feature vectors based at least on a combination of the respective merchant code, the respective payment code and the respective payment date code of each respective historical transaction data item;
wherein each respective transaction feature vector of the plurality of transaction feature vectors is associated with each respective transaction of the plurality of historical transaction data items;
utilize a prediction for a matching transaction representing a respective transaction from the plurality of historical transaction data items of the transaction history that matches the transaction information of the receipt based at least on the receipt feature vector and each of the plurality of respective transaction feature vectors;
determine a difference between the payment amount of the receipt and the respective payment authorization associated with the matching transaction based at least on a comparison between the transaction data encoded from the digital image of the receipt and the respective payment code associated with the matching transaction; and
causing to display, by the at least one processor, the alert on a screen of at least one computing device associated with the at least one user indicative of the difference; and
performing, by the at least one processor, at least one corrective action to remedy the difference.

12. The method of clause 11, wherein the transaction history comprises the plurality of historical transaction data items from a prior one day relative to a day associated with the receiving of the digital image.

13. The method of clause 11, wherein the transaction history comprises the plurality of historical transaction data items from a current day relative to a day associated with the receiving of the digital image.

14. The method of clause 11, wherein the plurality of historical transaction data items are associated with a plurality of pending transactions.

15. The method of clause 11, wherein the at least one fraud detection processor is further configured to generate a hold on the matching transaction prior to a posting of the matching transaction responsive to the difference between the payment amount associated with the receipt and the respective payment authorization associated with the matching transaction.

16. The method of clause 11, wherein the plurality of historical transaction data items are associated with a plurality of posted transactions.

17. The method of clause 11, wherein the at least one fraud detection processor is further configured to generate a fraud record of the difference between the payment amount associated with the receipt and the respective payment authorization associated with the matching transaction in a fraudulent authorization log;
wherein the fraudulent authorization log comprises at least one fraud record associated with an account associated with the at least one user;
wherein the at least one fraud record comprises at least one respective additional difference between at least one respective payment amount associated with at least one respective additional receipts and respective payment authorizations associated with at least one additional matching transactions that match the at least one respective additional receipts.

18. The method of clause 17, wherein the at least one fraud detection processor is further configured to:
Determine a number of the plurality from fraud records in the fraudulent authorization log; and
Generate an account hold preventing payments from an account associated with the at least one user upon the number of the plurality of fraud records exceeding a threshold.

19. The method of clause 11, wherein the at least one fraud detection processor is further configured to generate a fraud record of the difference between the payment amount associated with the receipt and the respective payment authorization associated with the matching transaction in a fraudulent authorization log;
wherein the fraudulent authorization log comprises at least one fraud record associated with the respective merchant;
wherein the at least one fraud record comprises at least one respective additional difference between at least one respective payment amount associated with at least one respective additional receipts and respective payment authorizations associated with at least one additional matching transactions that match the at least one respective additional receipts.

20. A system comprising:
at least one account database configured to store a transaction history associated with each of at least one user account;
at least one processor configured to implement instructions comprising:
receive a digital image of a receipt from a receipt scanning tool associated with at least one user;
wherein the receipt indicates transaction information comprises:
i) payee identification information associated with a receiver of a payment,
ii) a payment amount associated with a user payment to the receiver, and
iii) a payment date associated with the user payment to the receiver;
utilize an optical character recognition model to encode a digital representation of the transaction information by encoding the transaction information into transaction data;
extract a payee identification feature that represents the payee identification information based at least on the transaction data;
extract an amount identification feature that represents the payment amount based at least on the transaction data;
extract a payment date feature that represents the payment date based at least on the transaction data;
generate a receipt feature vector based at least on a combination of the payee identification feature, the amount identification feature and the payment date feature;
receive a transaction history associated with a user account in a user account database;
wherein the transaction history comprises a plurality of historical transaction data items representing a plurality of transactions;
wherein each respective historical transaction data item comprises:
i) a respective merchant code associated with a respective merchant of a respective transaction in the plurality of historical transaction data,
ii) a respective payment code associated with a respective payment authorization of the respective transaction in the plurality of historical transaction data, and
iii) a respective payment date code associated with the respective payment authorization;
generate a plurality of transaction feature vectors based at least on a combination of the respective merchant code, the respective payment code and the respective payment date code of each respective historical transaction data item;
wherein each respective transaction feature vector of the plurality of transaction feature vectors is associated with each respective transaction of the plurality of historical transaction data items;
utilize a prediction for a matching transaction representing a respective transaction from the plurality of historical transaction data items of the transaction history that matches the transaction information of the receipt based at least on the receipt feature vector and each of the plurality of respective transaction feature vectors;
determine a difference between the payment amount of the receipt and the respective payment authorization associated with the matching transaction based at least on a comparison between the transaction data encoded from the digital image of the receipt and the respective payment code associated with the matching transaction; and
cause to display an alert on a screen of at least one computing device associated with the at least one user indicative of the difference; and
perform at least one corrective action to remedy the difference.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor, a digital image of a receipt from a receipt scanning tool associated with the user;
   wherein the receipt corresponds to a user payment initiated by the user to a receiver;
   wherein the receipt indicates receipt information comprises:
      a receipt payee identifier associated with a receiver of the user payment,
      a receipt amount associated with the user payment to the receiver, and
      a receipt date associated with the user payment to the receiver;
utilizing, by the at least one processor, an optical character recognition model to encode the receipt information into transaction data so as to create a digital representation of the receipt;
extracting, by the at least one processor, a receipt payee identification feature that represents the receipt payee identifier based at least on the receipt data;
extracting, by the at least one processor, a receipt amount identification feature that represents the receipt amount based at least on the receipt data;
extracting, by the at least one processor, a receipt date feature that represents the receipt date based at least on the receipt data;
generating, by the at least one processor, a receipt feature vector based at least on a combination of the receipt payee identification feature, the receipt amount feature and the receipt date feature;
accessing in an electronic account of the user, by the at least one processor, a log of electronic transaction authorization request records comprising a plurality of electronic transaction authorization request records associated with a plurality of electronic transaction authorization requests to execute a plurality of user payments relative to the account of the user;
   wherein each electronic transaction authorization request record represents a transaction authorization request of a plurality of transaction authorization requests;
   wherein each transaction authorization request comprises:
      a request payee identifier data item associated with an entity associated with each transaction authorization request;
      a request amount data item associated with a transaction authorization request payment amount; and
      a request date data item associated with a date associated with each transaction authorization request;
generating, by the at least one processor for each electronic transaction authorization request record, a transaction authorization request feature vector based at least on the request payee identifier data item, the request amount data item and the request date data item;
inputting, by the at least one processor, at least the receipt feature vector and the transaction authorization request feature vector into a resolution machine learning model to generate a prediction that identifies a particular electronic transaction authorization request record as matching to the receipt captured in the digital image;
   wherein the resolution machine learning model is configured to:
      ingest the receipt feature vector,
      ingest the transaction authorization request feature vector, and
      measure a similarity between the receipt feature vector and the transaction authorization request feature vector by applying resolution classification parameters of the resolution machine learning model to the receipt feature vector and the transaction authorization request feature vector;
         wherein the resolution classification parameters of the resolution machine learning model have been trained based on error between:
            historical electronic transaction authorization request records, and
            historical digital images of historical receipts;
   wherein the particular electronic transaction authorization request record corresponds to the user payment initiated by the user to the receiver;
determining, by the at least one processor, a difference between the receipt amount and the transaction authorization request payment amount based at least on the receipt data and the transaction authorization request of the particular electronic transaction authorization request record so as to determine a discrepancy between:
   an electronic transaction authorization request to execute the user payment, and
   the user payment to the receiver via the receipt;
determining, by the at least one processor, that the transaction authorization request comprises a fraudulent payment quantity based at least in part on the difference;
modifying, by the at least one processor, the user account to deny the transaction authorization request prior to the transaction posting to the user account based on the fraudulent payment quantity; and
causing to display, by the at least one processor, an alert on a screen of at least one computing device associated with the at least one user indicative of the difference.

2. The method of claim 1, further comprising generating, by the at least one processor, a hold on the matching transaction prior to a posting of the matching transaction responsive to the difference between the payment amount associated with the receipt and the respective payment authorization associated with the matching transaction.

3. The method of claim 1, further comprising generating, by the at least one processor, a fraud record of the difference between the payment amount associated with the receipt and the respective payment authorization associated with the matching transaction in a fraudulent authorization log;
   wherein the fraudulent authorization log comprises at least one fraud record associated with an account associated with the at least one user;
   wherein the at least one fraud record comprises at least one respective additional difference between at least one respective payment amount associated with at least one respective additional receipts and respective payment authorizations associated with at least one additional matching transactions that match the at least one respective additional receipts.

4. The method of claim 3, further comprising:
determining, by the at least one processor, a number of fraud records in the fraudulent authorization log; and generating, by the at least one processor, an account hold preventing payments from an account associated with the at least one user upon the number of fraud records exceeding a threshold.

5. The method of claim 4, wherein the threshold comprises about 10.

6. The method of claim 1, further comprising generating, by the at least one processor, a fraud record of the difference between the payment amount associated with the receipt and the respective payment authorization associated with the matching transaction in a fraudulent authorization log;
   wherein the fraudulent authorization log comprises at least one fraud record associated with the respective merchant;
   wherein the at least one fraud record comprises at least one respective additional difference between at least one respective payment amount associated with at least one respective additional receipts and respective payment authorizations associated with at least one additional matching transactions that match the at least one respective additional receipts.

7. A system comprising:
   at least one account database configured to store a transaction history associated with each of at least one user account;
   a non-transient computer memory, comprising instruction;
   at least one processor configured, when executing the instructions, to:
      receive a digital image of a receipt from a receipt scanning tool associated with the user;
         wherein the receipt corresponds to a user payment initiated by the user to a receiver;
         wherein the receipt indicates receipt information comprises:
            a receipt payee identifier associated with a receiver of the user payment,
            a receipt amount associated with the user payment to the receiver, and
            a receipt date associated with the user payment to the receiver;
      utilize an optical character recognition model to encode the receipt information into transaction data so as to create a digital representation of the receipt;
      extract a receipt payee identification feature that represents the receipt payee identifier based at least on the receipt data;
      extract a receipt amount identification feature that represents the receipt amount based at least on the receipt data;
      extract a receipt date feature that represents the receipt date based at least on the receipt data;
      generate a receipt feature vector based at least on a combination of the receipt payee identification feature, the receipt amount feature and the receipt date feature;
      access in an electronic account of the user a log of electronic transaction authorization request records comprising a plurality of electronic transaction authorization request records associated with a plurality of electronic transaction authorization requests to execute a plurality of user payments relative to the account of the user;
         wherein each electronic transaction authorization request record represents a transaction authorization request of a plurality of transaction authorization requests;
         wherein each transaction authorization request comprises:
            a request payee identifier data item associated with an entity associated with each transaction authorization request;
            a request amount data item associated with a transaction authorization request payment amount; and
            a request date data item associated with a date associated with each transaction authorization request;
      generate, for each electronic transaction authorization request record, a transaction authorization request feature vector based at least on the request payee identifier data item, the request amount data item and the request date data item;
      input at least the receipt feature vector and the transaction authorization request feature vector into a resolution machine learning model to generate a prediction that identifies a particular electronic transaction authorization request record as matching to the receipt captured in the digital image:
         wherein the resolution machine learning model is configured to:
            ingest the receipt feature vector,
            ingest the transaction authorization request feature vector, and
            measure a similarity between the receipt feature vector and the transaction authorization request feature vector by applying resolution classification parameters of the resolution machine learning model to the receipt feature vector and the transaction authorization request feature vector;
               wherein the resolution classification parameters of the resolution machine learning model have been trained based on error between:
                  historical electronic transaction authorization request records, and
                  historical digital images of historical receipts;
         wherein the particular electronic transaction authorization request record corresponds to the user payment initiated by the user to the receiver;
      determine a difference between the receipt amount and the transaction authorization request payment amount based at least on the receipt data and the transaction authorization request of the particular electronic transaction authorization request record so as to determine a discrepancy between:
         an electronic transaction authorization request to execute the user payment, and
         the user payment to the receiver via the receipt;
      determine that the transaction authorization request comprises a fraudulent payment quantity based at least in part on the difference;
      modify the user account to deny the transaction authorization request prior to the transaction posting to the user account based on the fraudulent payment quantity; and
      cause to display an alert on a screen of at least one computing device associated with the at least one user indicative of the difference.

8. The system of claim 7, wherein the at least one processor is further configured, when executing the instructions, to generate a hold on the matching transaction prior to a posting of the matching transaction responsive to the difference between the payment amount associated with the receipt and the respective payment authorization associated with the matching transaction.

9. The system of claim 7, wherein the at least one processor is further configured, when executing the instructions, to generate a fraud record of the difference between the payment amount associated with the receipt and the respective payment authorization associated with the matching transaction in a fraudulent authorization log;
- wherein the fraudulent authorization log comprises at least one fraud record associated with an account associated with the at least one user;
- wherein the at least one fraud record comprises at least one respective additional difference between at least one respective payment amount associated with at least one respective additional receipts and respective payment authorizations associated with at least one additional matching transactions that match the at least one respective additional receipts.

10. The system of claim 9, wherein the at least one processor is further configured, when executing the instructions, to:
- determine a number of fraud records in the fraudulent authorization log; and
- generate an account hold preventing payments from an account associated with the at least one user upon the number of fraud records exceeding a threshold.

11. The system of claim 10, wherein the threshold comprises about 10.

12. The system of claim 7, wherein the at least one processor is further configured, when executing the instructions, to:
- generate a fraud record of the difference between the payment amount associated with the receipt and the respective payment authorization associated with the matching transaction in a fraudulent authorization log;
- wherein the fraudulent authorization log comprises at least one fraud record associated with the respective merchant;
- wherein the at least one fraud record comprises at least one respective additional difference between at least one respective payment amount associated with at least one respective additional receipts and respective payment authorizations associated with at least one additional matching transactions that match the at least one respective additional receipts.

* * * * *